(12) United States Patent
Takada et al.

(10) Patent No.: US 9,828,749 B2
(45) Date of Patent: Nov. 28, 2017

(54) WORKING MACHINE

(71) Applicant: Hitachi Construction Machinery Co., Ltd., Bunkyo-ku, Tokyo (JP)

(72) Inventors: Tomonori Takada, Tsuchiura (JP); Shigeyuki Yoshihara, Tsuchiura (JP); Toshihiko Ishida, Tsuchiura (JP); Nobuyoshi Takahashi, Tsuchiura (JP); Naoya Kawakami, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 32 days.

(21) Appl. No.: 14/915,736

(22) PCT Filed: Feb. 27, 2015

(86) PCT No.: PCT/JP2015/055943
§ 371 (c)(1),
(2) Date: Mar. 1, 2016

(87) PCT Pub. No.: WO2015/141449
PCT Pub. Date: Sep. 24, 2015

(65) Prior Publication Data
US 2016/0194855 A1    Jul. 7, 2016

(30) Foreign Application Priority Data
Mar. 18, 2014    (JP) ................................ 2014-055576

(51) Int. Cl.
*E02F 9/26*    (2006.01)
*B60L 3/00*    (2006.01)
*E02F 9/20*    (2006.01)

(52) U.S. Cl.
CPC ............ *E02F 9/268* (2013.01); *B60L 3/0061* (2013.01); *E02F 9/2075* (2013.01)

(58) Field of Classification Search
CPC ........ E02F 9/268; E02F 9/2075; B60L 3/0061
See application file for complete search history.

(56) References Cited

U.S. PATENT DOCUMENTS

2009/0009920 A1    1/2009 Yamada
2012/0130576 A1    5/2012 Sugiyama et al.
(Continued)

FOREIGN PATENT DOCUMENTS

JP    5-176478 A    7/1993
JP    2006-121844 A    5/2006
(Continued)

OTHER PUBLICATIONS

Toyota, Machine translation JP 2009-142053, Jun. 25, 2009.*
(Continued)

*Primary Examiner* — Rodney Butler
*Assistant Examiner* — Frederick Brushaber
(74) *Attorney, Agent, or Firm* — Crowell & Moring LLP

(57) ABSTRACT

To provide a hybrid wheel loader capable of reliably detecting a short-circuited state of a synchronous generator driven by a drive source. The present invention is provided with an MG 4 being a synchronous generator driven as an electric generator by an engine and operated as a motor by the electric power supplied from an electrical storage device 9, an MG inverter 5 having a motor current sensor 5d for detecting motor current flowing through the MG 4 and semiconductor switches 5a, 5b, and an HCU 10 for detecting a short-circuited state of the MG 4, wherein the HCU 10 determines that the MG 4 is in a short-circuited state when the semiconductor switches 5a, 5b of the MG inverter 5 are in an OFF state at gates and when the motor current detected by the motor current sensor 5d is equal to or greater than a specified threshold value.

2 Claims, 7 Drawing Sheets

(56) References Cited

U.S. PATENT DOCUMENTS

| | | | | |
|---|---|---|---|---|
| 2013/0134840 A1* | 5/2013 | Murata | ............... | E02F 9/0858 |
| | | | | 310/67 R |
| 2015/0167615 A1* | 6/2015 | Komuro | ............... | B60K 6/48 |
| | | | | 290/31 |
| 2016/0194855 A1* | 7/2016 | Takada | ............... | B60L 3/0061 |
| | | | | 701/29.1 |

FOREIGN PATENT DOCUMENTS

| | | |
|---|---|---|
| JP | 2009-142053 A | 6/2009 |
| JP | 4438833 B2 | 3/2010 |
| JP | 2010-222815 A | 10/2010 |

OTHER PUBLICATIONS

International Search Report (PCT/ISA/210) issued in PCT Application No. PCT/JP2015/055943 dated Mar. 24, 2015 with English-language translation (four (4) pages).

Japanese-language Written Opinion (PCT/ISA/237) issued in PCT Application No. PCT/JP2015/055943 dated Mar. 24, 2015 (four (4) pages).

\* cited by examiner

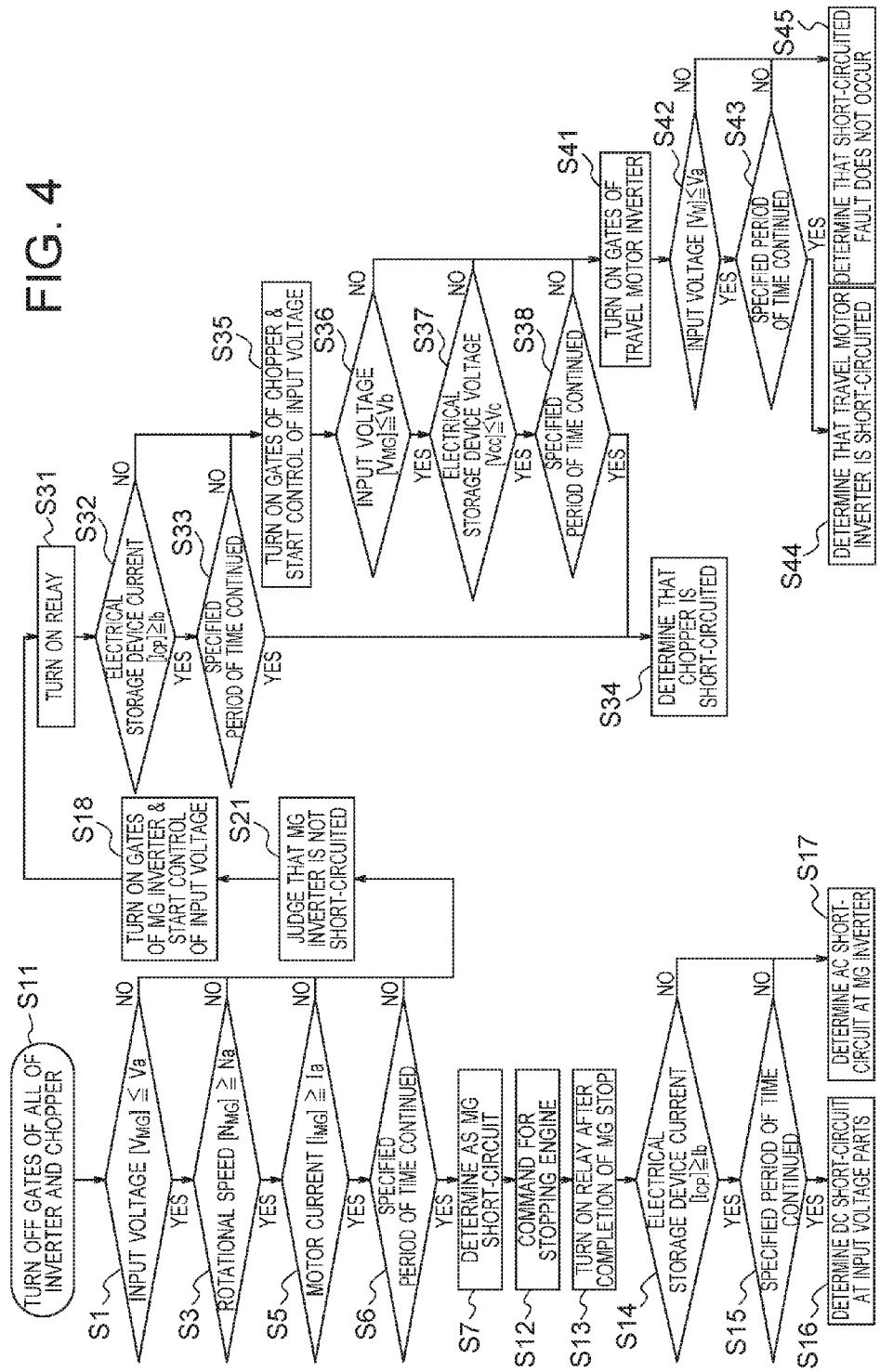

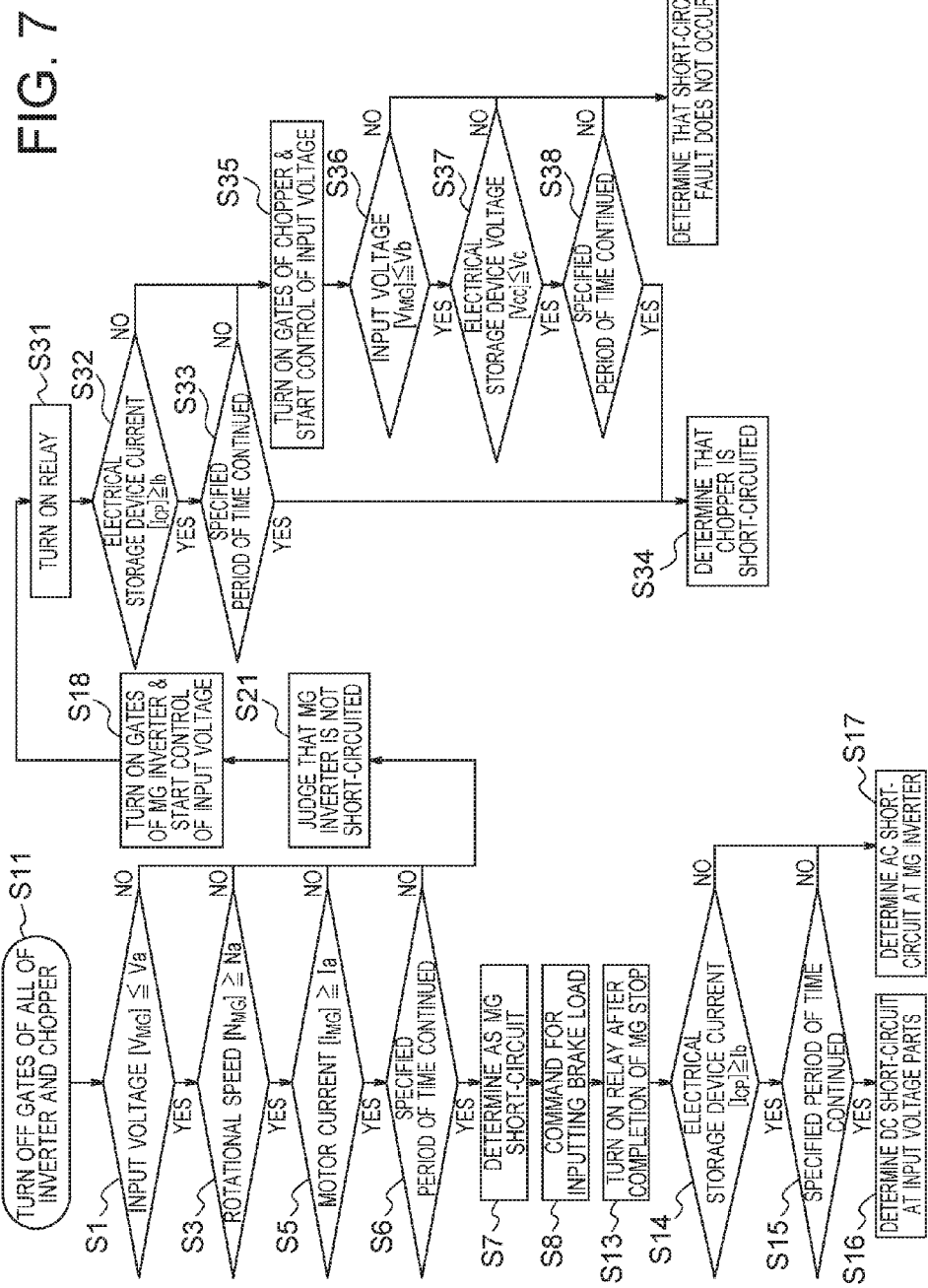

WORKING MACHINE

TECHNICAL FIELD

The present invention relates to a working machine provided with a permanent-magnet synchronous generator for driving a drive unit of, for example, a traveling apparatus or the like.

BACKGROUND ART

Heretofore, the prior art using a permanent-magnet synchronous generator of this kind is disclosed in Patent Literature 1, for example. In this Patent Literature 1, there are provided an inverter module for controlling a three-phase AC motor being a permanent-magnet synchronous generator and current detection means for detecting electric current flowing through the inverter module. Further, a construction is taken that, when the current detection means detects electric current exceeding a current value determined in advance, the operation of the inverter module is discontinued and then, a short-circuited place at switching elements inside the inverter module is detected by the use of a switching pattern for short-circuit detection.

CITATION LIST

Patent Literature

Patent Literature 1: JP4438833B

SUMMARY OF INVENTION

Technical Problem

However, in the prior art disclosed in the aforementioned Patent Literature 1, when the inverter module falls in a short-circuited fault where a construction is taken to transmit the driving power of an engine being a primary power source to the three-phase AC motor, the power outputted by the running of the engine is transmitted to continue the rotation of the three-phase AC motor irrespective of the inverter module held out of operation. Accordingly, because the induced voltage generated by the rotation of the three-phase AC motor makes short-circuit current continue to flow through the inverter module, it is not necessarily able to detect the abnormality of the inverter module.

Further, a fear arises in that the continuation of the short-circuit current flowing through the inverter module affects a secondary damage because of a probability that a local heat generation may take place in the inverter module and the like. For the above reasons, it is necessary to reliably detect a short-circuited fault in the inverter module where the three-phase AC motor is attached to be driven by the driving power of the engine.

The present invention has been made taking the circumstances in the aforementioned prior art into consideration, and an object thereof is to provide a working machine capable of reliably detecting a short-circuit in a synchronous generator driven by a drive power source to generate electric power.

Solution to Problem

In order to attain this object, the present invention comprises a drive source, a synchronous generator for generating electric power by the drive source, an inverter having a current detection unit for detecting current flowing through the synchronous generator and switching elements, an electrical storage device for storing the electric power by the synchronous generator through the inverter, and a control unit for detecting an electric abnormality in the synchronous generator, wherein that the control unit turns off gates of the switching elements of the inverter when detecting the electric abnormality in the synchronous generator, and, where in this state current equal to or greater than a predetermined value is continuously detected by the current detection unit for a predetermined period of time or more, judges that the inverter is in a short-circuited state.

Advantageous Effects of Invention

The present invention is constructed as described above and is configured to judge that the inverter is in a short-circuited state when it is detected that electric current exceeding the predetermined value continues to flow through the inverter for the predetermined period of time or more even after the gates of the switching elements of the inverter for controlling the synchronous generator are turned off. Thus, the short-circuited state of the inverter can reliably be detected even in a state that the drive source causes the synchronous generator to generate an electromotive force. Further, other objects, constructions and effects than those as aforementioned will be clarified by the following description of the embodiments.

BRIEF DESCRIPTION OF DRAWINGS

FIG. 4 is a flowchart for detecting a short-circuited state according to a first embodiment in the present invention.

FIG. 5 are charts showing characteristics of a synchronous generator relative to rotational speeds, wherein FIG. 5(a) is a graph showing inverter input voltage characteristics at the time of a normal state that an inverter input voltage is not being controlled, while

FIG. 7 is a flowchart for detecting a short-circuited state of a synchronous generator according to the second embodiment.

DESCRIPTION OF EMBODIMENTS

[First Embodiment]

Hereinafter, a hybrid wheel loader 1 will be described to be exemplified as a first embodiment of a working machine according to the present invention.

Figure 1:
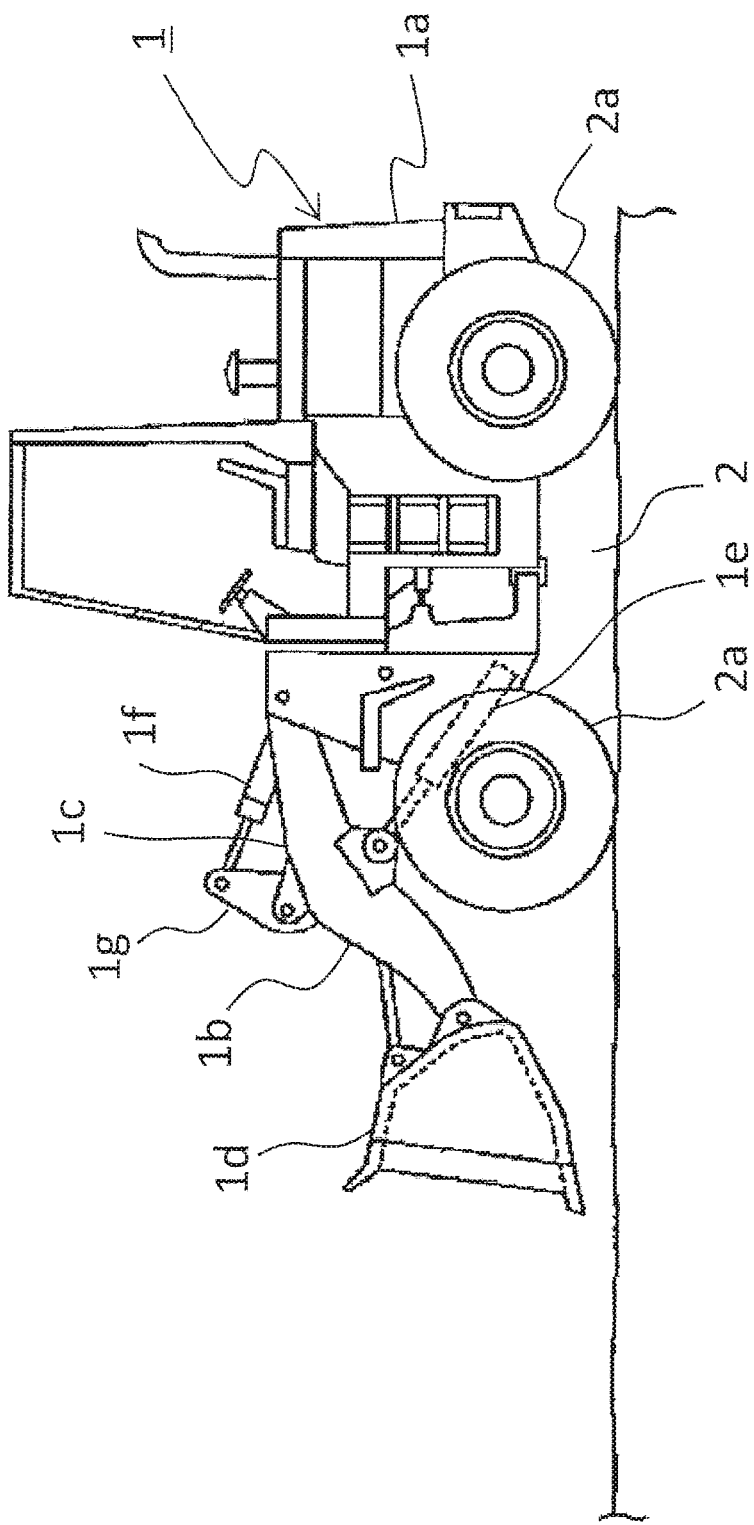
FIG. 1 is a side view of a hybrid wheel loader according to one embodiment in the present invention.
Figure 2:
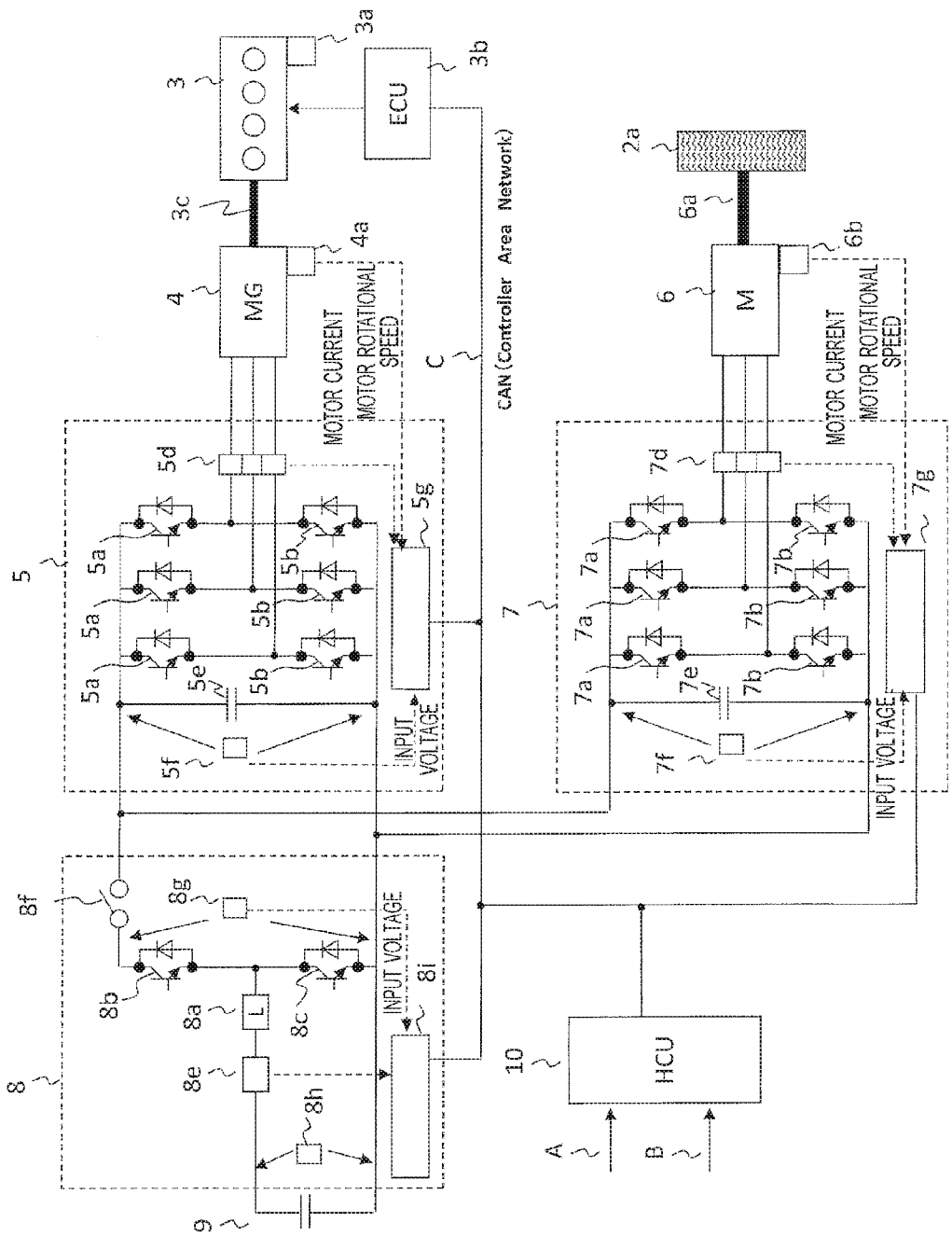
FIG. 2 is a schematic construction view showing a drive system of the hybrid wheel loader.

FIG. 1 is a side view showing a hybrid wheel loader according to the first embodiment in the present embodiment. FIG. 2 is a schematic construction view showing a drive system of the hybrid wheel loader.

<Construction>

As shown in FIG. 1, the hybrid wheel loader 1 is a motor-driven traveling wheel loader provided with a drive system whose traveling unit 2 takes a motor-driven construction, and is a hybrid construction vehicle with a so-called series type hybrid system mounted thereon. Incidentally, the hybrid working machine according to the present invention also includes one that assists the driving performed by a separate electric motor, in addition to those that assist a hydraulic driving.

The hybrid wheel loader 1 is provided on the front side of a body 1a with a front working device 1b as a drive unit used for excavation work of earth and sand or the like. Further, the body 1a has travel wheels 2a attached as running tires that make the body 1a move forward or reverse, namely, enabled to travel. These travel wheels 2a constitute a part of the traveling unit 2 and are driven by an electrically-driven travel motor 6 mounted on the body 1a.

The front working device 1b is provided with lift arms 1c connected to a front side of the body 1a to be vertically rotatable and a bucket 1d rotatably connected to extreme ends of the lift arms 1c. The lift arms 1c are driven by a lift arm cylinder (hydraulic cylinder) 1e being a hydraulic actuator. The bucket 1d is driven by a bell crank 1g to which the operation of a bucket cylinder (hydraulic cylinder) 1f being a hydraulic actuator is transmitted. These lift arm cylinder 1e and the bucket cylinder 1f are telescopically driven by the hydraulic pressure of working oil supplied from a hydraulic pump (not shown) that is driven by an engine 3 as a drive source and a motor generator (MG) 4 to be described later.

As shown in FIG. 2, the hybrid wheel loader 1 is provided with the engine 3 being the drive source. The engine 3 has attached thereto a starter 3a for starting the engine 3. The engine 3 has the engine rotational speed controlled by a command from an engine control unit (ECU) 3b as an engine control device. Then, an output shaft 3c of the engine 3 and a drive shaft of the MG (motor generator) 4 as a generator-motor are mechanically coupled, so that respective rotational torques are supplied to a hydraulic pump, not shown. This MG 4 is constituted by a permanent-magnet synchronous generator. That is, the MG 4 is a motor/generator which operates as a motor to contribute to driving the hydraulic pump when torque-assisting the engine 3, but operates as a generator to generate electric power by taking the engine 3 as the drive source at the time of steady traveling and at the time of deceleration. Further, the MG 4 has attached thereto a rotation sensor 4a for detecting the rotational speed of the MG 4 (motor rotational speed).

Furthermore, the MG 4 is connected to an MC inverter 5 as a power conversion device and is subjected to the inverter control by the MG inverter 5. The MG inverter 5 is a three-phase inverter device that supplies the MG 4 with the electric power from an electrical storage device 9 referred to later to drive the MG 4 as a motor and that conversely supplies electric power to the electrical storage device 9 when the engine 3 operates the MG 4 as a generator. The MG inverter 5 is composed of semiconductor switches 5a, 5b such as, for example, IGBTs (Insulated Gate Bipolar Transistors) and the like as switching elements. These semiconductor switches 5a, 5b are generally known as power semiconductor elements and are configured as a bridge circuit including six elements in total. Further, sources of these semiconductor switches 5a and drains of the semiconductor switches 5b are electrically connected to the MG 4 through a motor current sensor 5d. This motor current sensor 5d is a current detection unit for detecting the electric current (motor current) outputted from the MG 4.

Furthermore, between the drains of these semiconductor switches 5a and the sources of the semiconductor switches 5b, a main smoothing capacitor 5e and an inverter input voltage sensor 5f are connected mutually in parallel. The main smoothing capacitor 5e smoothens DC voltage. The inverter input voltage sensor 5f is a voltage detection part for detecting an input voltage to the inverter 5. Further, the rotation sensor 4a, the motor current sensor 5d and the inverter input voltage sensor 5f are connected to an inverter control circuit 5g built in the MG inverter 5.

On the other hand, the traveling unit 2 is provided with a travel motor 6 as a drive unit. The travel motor 6 is driven by the electric power supplied from the electrical storage device 9. The travel wheels 2a are attached to a travel propeller shaft 6a being an output shaft of the travel motor 6. Further, the travel motor 6 has attached thereto a rotation sensor 6b for detecting the rotational speed of the travel motor 6 (motor rotational speed). Then, for operating as an electric motor, the travel motor 6 has attached thereto a travel motor inverter 7 as a power conversion device. This travel motor inverter 7 is composed of semiconductor switches 7a, 7b, a motor current sensor 7d, a main smoothing capacitor 7e, an inverter input voltage sensor 7f and an inverter control circuit 7g and takes the same construction as that of the aforementioned MG inverter 5.

Then, the MG inverter 5 and the travel motor inverter 7 are connected to the electrical storage device 9 such as, for example, a capacitor through a chopper 8. The chopper 8 is composed of a reactor 8a being an inductance and semiconductor switches 8B, 8C such as, for example, IGBTs. The reactor 8a is connected at one end to a positive electrode of the electrical storage device 9 and at the other end to a source of the semiconductor switch 8b and a drain of the semiconductor switch 8c. Incidentally, the electric current flowing through the chopper 8 is detected by a chopper current sensor 8e. A drain of the semiconductor switch 8b is connected to one ends of the MG inverter 5 and the travel motor inverter 7 respectively through a relay 8f as a switch. A source of the semiconductor switch 8c is connected to other ends of the MG inverter 5 and the travel motor inverter 7 respectively.

Further, a voltage sensor 8g is attached in parallel to the semiconductor switches 8b, 8c as a pair. This voltage sensor 8g detects an input voltage between the pair of semiconductor switches 8b, 8c. Further, an electrical storage device voltage sensor 8h is attached in parallel to the electrical storage device 9. The electrical storage device voltage sensor 8h detects a voltage across the electrical storage device 9. Then, these voltage sensor 8g, electrical storage device voltage sensor 8h and chopper current sensor 8e are connected to a chopper control circuit 8i built in the chopper 8.

The electrical storage device 9 is charged with the generated electric power from the MG 4 through the chopper 8 and supplies the MG 4 and the travel motor 6 with electric power through the MG inverter 5 and the travel motor inverter 7.

Furthermore, the ECU 3b, the inverter control circuits 5g, 7g, the chopper control circuit 8i and an HCU (hybrid control unit) 10 being an integrated control device as a main controller are connected by the use of a CAN (Controller Area Network) communication or the like and are able to transmit and receive command values and state parameters with one another. This HCU 10 has inputted thereto a start signal A that is inputted in starting the hybrid wheel loader 1, and a manipulated signal B and the like responding to the stepping operation of an acceleration pedal (not shown) for traveling or to the operation of an operation lever, not shown, for operating the front working device 1b, and the HCU 10 integrally controls the engine 3, the MG 4, the travel motor 6 and the chopper 8 in response to these input signals. For example, the HCU 10 processes the start signal A, the manipulated signal B and the like, generates torque commands to the MG 4 and the travel motor 6 where the same are to be driven, and performs data transmission to the inverter control circuit 5g of the MG inverter 5, the inverter control circuit 7g of the travel motor inverter 7 and the chopper control circuit 8i by way of the CAN. Further, the HCU 10 acquires respective input voltage information to the MG inverter 5, the travel motor inverter 7 and the chopper 8 by way of the CAN and controls the respective input voltages by transmitting command values to the MG inverter control circuit 5g, the travel motor inverter control circuit 7g, and the chopper control circuit 8i so that these voltage values come to agree with desired values.

The inverter control circuit 5g of the MG inverter 5 receives a torque command from the HCU 10 through the CAN and performs a PWM (Pulse Width Modulation) control by turning on/off gates of the respective semiconductor switches 5a, 5b based on the information from the rotation sensor 4a, the motor current sensor 5d and the inverter input voltage sensor 5f to control the driving of the MG 4 so that a desired motor torque is generated. Likewise, the inverter control circuit 7g of the travel motor inverter 7 receives a torque command from the HCU 10 through the CAN and performs a PWM control by turning on/off gates of the respective semiconductor switches 7a, 7b based on the information from the rotation sensor 6b, the motor current sensor 7d and the inverter input voltage sensor 7f to control the driving of the travel motor 6 so that a desired motor torque is generated.

The chopper control circuit 8i receives commands regarding the power supply to the MG 4 and the travel motor 6 from the HCU 10 through the CAN and performs a PWM control by turning on/off gates of the respective semiconductor switches 8b, 8cb based on the information from the chopper current sensor 8e and the voltage sensor 8g to supply, by making use of the reactor 8a, the electric power stored in the electrical storage device 9 to the MG 4 and the travel motor 6 through the MG inverter 5 and the travel motor inverter 7. Up to here, description has been made regarding the case where the MG 4 and the travel motor 6 are operated as motors. On the other hand, also in the case where the MG 4 is to be operated as an electric generator, the HCU 10 outputs command signals to the ECU 3b, the inverter control circuits 5g, 7g and the chopper control circuit 8i based on the start signal A, the manipulated signal B and the like. Incidentally, the ECU 3b for the engine 3 receives an engine rotational command from the HCU 10 through the CAN and controls the rotational speed of the engine 3. Further, the ECU 3b stops the engine 3 upon receiving an engine stop request from the HCU 10.

Next, with reference to a flowchart shown in FIG. 3, description will be made regarding a method for determination by the HCU 10 of a short-circuited abnormality of the MG inverter 5 in the hybrid wheel loader 1 of the foregoing first embodiment.

First of all, a determination is made of whether or not an electric abnormality of some kind has occurred in the MG 4. In the present embodiment, as an example, it is determined first whether or not the input voltage [$V_{MG}$] detected by the inverter input voltage sensor 5f of the MG inverter 5 is equal to or less than a specified value [Va] determined in advance, namely, whether $V_{MG} \leq Va$ or not (S1). If as the determination result at S1, the $V_{MG}$ is greater than the Va, namely, in the case of $V_{MG} > Va$ (the case of No), the MG inverter 5 is determined not to be short-circuited and thus, to be normal (S2).

Then, if as the determination result at S1, the $V_{MG}$ is equal to or less than the Va, namely, in the case of $V_{MG} \leq Va$ (the case of Yes), it is determined whether or not the rotational speed [$N_{MG}$] of the MG 4 detected by the rotation sensor 4a attached to the MG 4 is equal to or greater than a specified value [Na] determined in advance, namely, whether $N_{MG} \geq Na$ or not (S3). If as the determination result at S3, the $N_{MG}$ is less than the Na, namely, in the case of $N_{MG} < Na$ (the case of No), the processing proceeds to S2, at which the MG inverter 5 is determined not to be short-circuited and thus, to be normal.

Figure 5B:
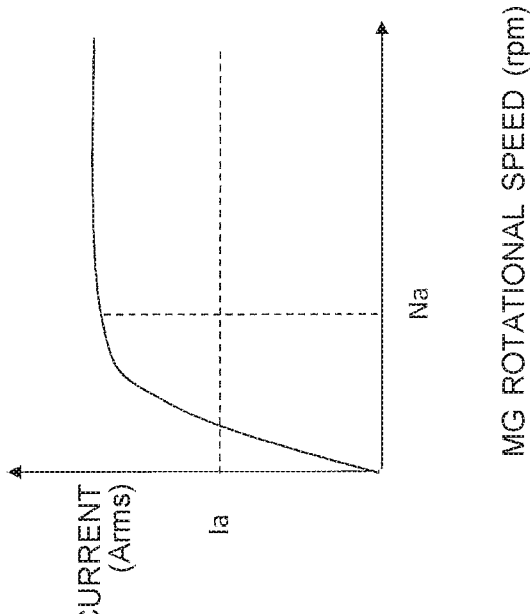
FIG. 5(b) is a graph showing motor current characteristics at the time of a short-circuited state.
Figure 5A:
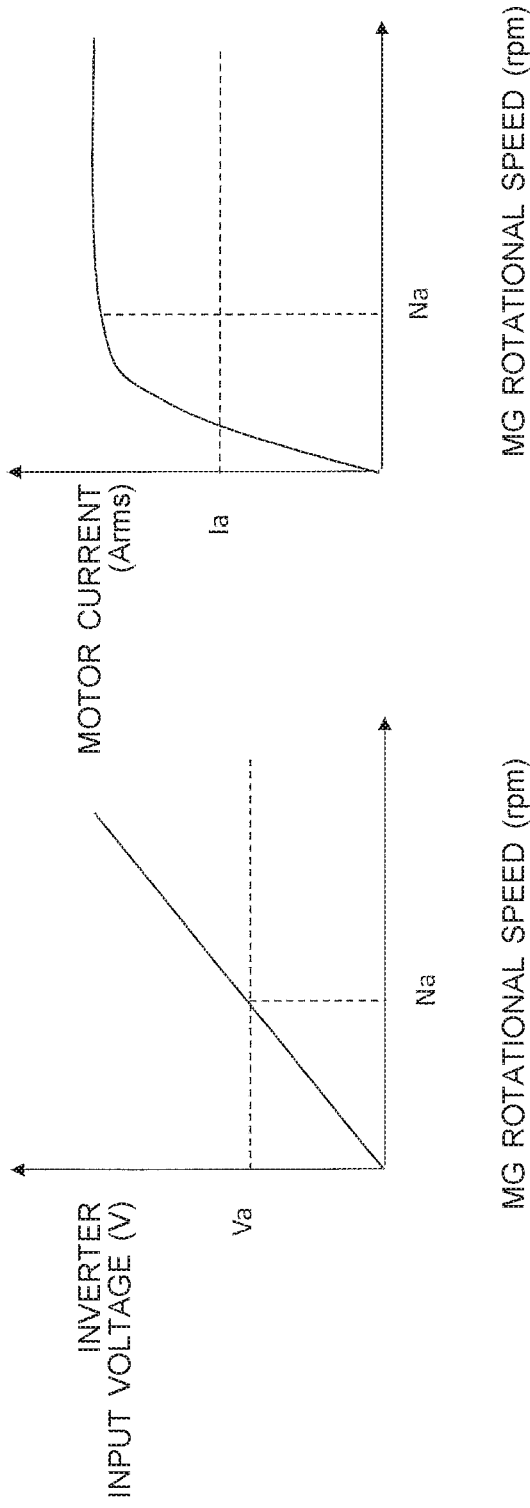

On the contrary, if as the determination result at S3, the $N_{MG}$ is equal to or greater than the Na, namely, in the case of $N_{MG} \geq Na$ (the case of Yes), it is determined that an electric abnormality of some kind has likely occurred with the MG 4 and devices connected to the MG 4, and the transition to the next step S4 is made. Incidentally, unless any abnormality has occurred as shown in FIG. 5(a), the rotational speed $N_{MG}$ of the MG 4 is in proportion to the inverter input voltage $V_{MG}$ when the inverter input voltage is not controlled, and at steps S1 and S3, the likelihood of an abnormality is judged in dependence on whether or not the $V_{MG}$ is less than the proportional relation. Then, the gates of all of the semiconductor switches 5a, 5b in the MG inverter 5 are turned to an OFF-state, and the PWM control by the MG inverter 5 is stopped (S4). Thereafter, a determination is made of whether or not the motor current [$I_{MG}$] detected by the motor current sensor 5d of the MG inverter 5 is equal to or greater than a specified threshold value [Ia] determined in advance, namely, whether $I_{MG} \geq Ia$ or not. If as the determination result at S5, the $I_{MG}$ is less than the Ia, namely, in the case of $I_{MG} < Ia$ (the case of No), the processing proceeds to S2, at which the MG inverter 5 is determined not to be short-circuited and thus, to be normal. Incidentally, the Ia is set to a current value which is, for example, twice or so as much as the rated current.

Furthermore, if as the determination result at S5, the $I_{MG}$ is equal to greater than the Ia, namely, in the case of $I_{MG} \geq Ia$ (the case of Yes), it is determined whether or not the MG 4 is in the state of rotation and whether or not the state that the motor current $I_{MG}$ of the MG 4 with the MG inverter 5 being OFF flows in a quantity equal to or greater than a specified current Ia continues past a specified period of time [Ta] determined in advance, namely, whether or not the continuation period of time $T_{MG}$ is equal to greater than the specified period of time Ta (S6). If the $T_{MG}$ is less than the Ta as a denial in the determination at S6, namely, in the case of $T_{MG} < Ta$ (the case of No), the processing proceeds to S2, at which a determination is made as being normal because of no short-circuit occurring.

On the other hand, if the determination at S6 is affirmed, namely, in the case of $T_{MG} \geq Ta$ (the case of Yes), the MG inverter 5 is determined to be in a short-circuited state (S7). Here, FIG. 5(b) is a graph indicating the relation between the motor current $I_{MG}$ flowing through the MG inverter 5 and the rotational speed $N_{MG}$ of the MG 4 when the switching elements 5a, 5b are placed in the OFF state in the case of a short-circuited abnormality occurring in the MG inverter 5. As shown in this graph, at the time of the short-circuited abnormality, the motor current $I_{MG}$ flows to or over the specified electric current Ia while the rotational speed of the MG 4 is equal to or greater than the specified rotational speed Na. Then, if at S7 the MG 4 is determined in the short-circuited state, an engine stop command is sent from the HCU 10 to the ECU 3b. Thus, the running of the engine 3 is discontinued.

Next, with reference to a flowchart shown in FIG. 4, description will be made regarding a determination method of seeking an actual short-circuited place by applying the aforementioned short-circuited abnormality determination method for the MG inverter 5 to the entire drive system including the travel motor inverter 7 and the chopper 8.

When an abnormality of some kind such as a drop in the input voltage detected by the inverter input voltage sensor 5f and the like is detected by the HCU 10 with the engine 3 running, all of the semiconductor switches 5a, 5b, 7a, 7b, 8b, 8c in the MG inverter 5, the travel motor inverter 7 and the chopper 8 are turned to an OFF state at the gates, and right after this, the relay 8f is turned to an OFF state (S11).

Figure 3:
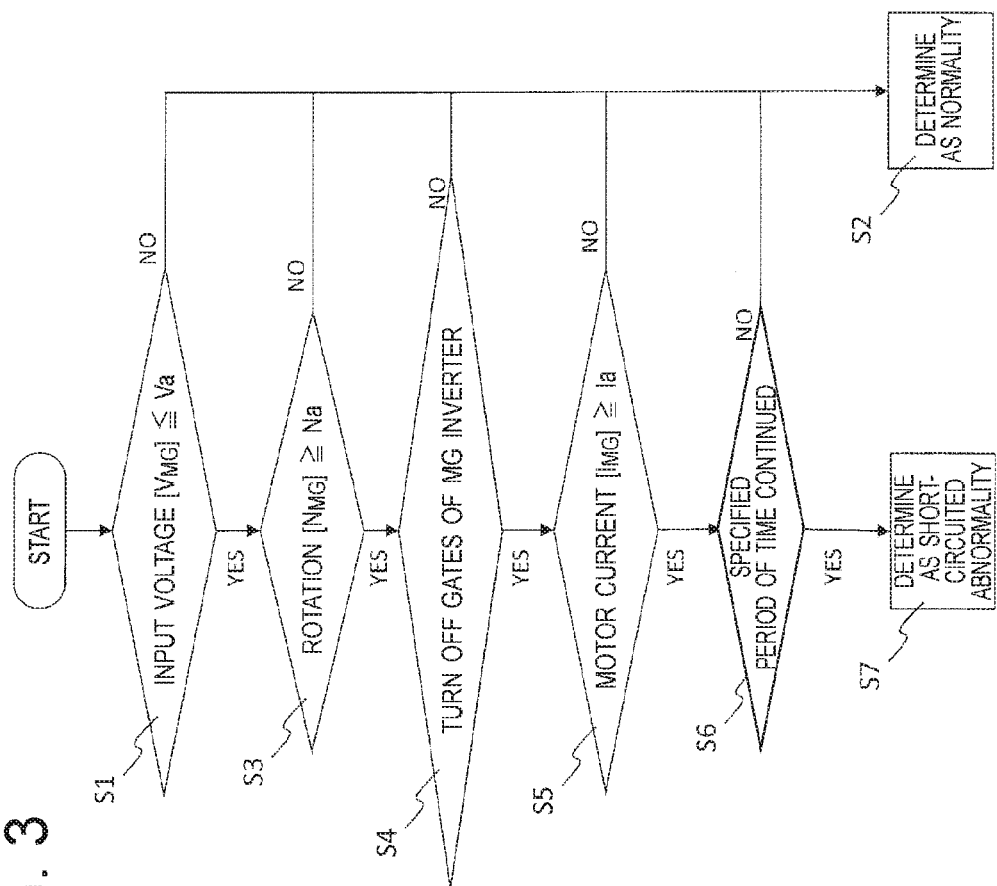
FIG. 3 is a flowchart for explaining a basic approach to detecting an inverter short-circuited abnormality in the present invention.

If any one of the aforementioned S1, S3, S5, S6 is denied, the MG inverter 5 is determined not to be short-circuited as having been described based on the aforementioned flowchart shown in FIG. 3. (S21)

On the other hand, if the S1, S3, S5, S6 are all affirmed, the processing proceeds to S7 to determine that the MG 4 is in a short-circuited state. Then, if the MG 4 is determined to be in the short-circuited state at step S7, the engine stop command is sent from the HCU 10 to the ECU 3b (S12). Thus, the fuel supply to the engine 3 is stopped, and after the stop of the MG 4, the relay 8f is turned on to apply the voltage across the chopper 8 to the MG inverter 5 (S13).

Then, the electrical storage device current [$I_{CP}$] detected by the chopper current sensor 8e is determined as to whether to be equal to or greater than the specified value [Ib] determined in advance or not, namely, whether $I_{CP} \geq Ib$ or not (S14). If as the determination result at S14, the $I_{CP}$ is equal to or greater than Ib, namely, in the case of $I_{CP} \geq Ib$ (the case of Yes), a determination is made of whether or not the continuation period of time [$T_{CP}$] during which the state of $I_{CP} \geq Ib$ continues is equal to or greater than the specified period of time [Tb] determined in advance, namely, whether $T_{CP} \geq Tb$ or not (S15).

If as the determination result at S15, the $T_{CP}$ is equal to or greater than the Tb, namely, in the case of $T_{CP} \geq Tb$ (the case of Yes), the input parts of the chopper 8 and the MG inverter 5, inclusive of the main smoothing filter 5e, are all in a short-circuited state (S16). In this case, the drive system becomes unusable.

On the contrary, if as the determination result at S14, the $I_{CP}$ is less than the Ib, namely, in the case of $I_{CP} < Ib$ (the case of No) or if as the determination result at S15, the $T_{CP}$ is less than the Tb, namely, in the case of $T_{CP} < Tb$ (the case of No), it is determined that the input part of the MG inverter 5 is not short-circuited but only either one of the semiconductor switches 5a, 5b in the MG inverter 5 is short-circuited (S17). Although the MG 4 is unusable in this case, there remains a possibility that the travel motor 6 and the electrical storage device 9 are usable.

On the other hand, if the MG inverter 5 is determined to be normal at step S21, the respective semiconductor switches 5a, 5b of the MG inverter 5 are turned to an ON state at the gates, and the control of the input voltage to the MG 4 is started (S18).

Subsequently, the relay 8f is turned on to detect any short circuit at other places than the MG inverter 5 (S31). After this, as done at S14, the electrical storage device current [$I_{CP}$] detected by the chopper current sensor 8e is determined as to whether to be equal to or greater than the specified value [Ib] determined in advance or not, namely, whether $I_{CP} \geq Ib$ or not (S32).

Then, if as the determination result at S32, the $I_{CP}$ is equal to or greater than the Ib, namely, in the case of $I_{CP} \geq Ib$ (the case of Yes), a determination is made of whether or not the continuation period of time [$T_{CP}$] during which the state of $I_{CP} \geq Ib$ continues is equal to or greater than the specified period of time [Tb] determined in advance, namely, whether $T_{CP} \geq Tb$ or not (S33), as done at S15. If as the determination result at S33, the $T_{CP}$ is equal to or greater than the Tb, namely, in the case of $T_{CP} \geq Tb$ (the case of Yes), it is determined as done at S16 that the chopper 8 is short-circuited at the input part and is unusable because of being in a short-circuited state (S34). In this case, the electrical storage device 9 cannot be used, while the possibility of the MG 4 and the travel motor 6 being used remains by turning off the relay 8f and electrically separating the electrical storage device 9.

Further, if as the determination result at S32, the $I_{CP}$ is less than the Ib, namely, in the case of $I_{CP} < Ib$ (the case of No) or if as the determination result at S33, the $T_{CP}$ is less than the Tb, namely, in the case of $T_{CP} < Tb$ (the case of No), the respective semiconductor switches 8b, 8c of the chopper 8 are turned to an ON state at the gates to start the control of the input voltage of the electrical storage device 9 (S35). After S35, the input voltage [$V_{MG}$] detected by the inverter input voltage sensor 5f is determined as to whether to be equal to or less than a specified control voltage [Vb] determined in advance or not, namely, whether $V_{MG} \leq Vb$ or not (S36). If as the determination result at S36, the $V_{MG}$ is equal to or less than the Vb, namely, in the case of $V_{MG} \leq Vb$ (the case of Yes), an electrical storage device voltage [$V_{CC}$] detected by the electrical storage device voltage sensor 8h is determined as to whether to be equal or less than a specified value [Vc] determined in advance or not, namely, whether $V_{CC} \leq Vc$ or not (S37). Here, the electrical storage device voltage [$V_{CC}$] is set to a voltage level of, for example, 200-300 volts.

Furthermore, if as the determination result at S37, the $V_{CC}$ is equal to or less than the Vc, namely, in the case of $V_{CC} \leq Vc$ (the case of Yes), the continuation period of time [$T_{CC}$] during which the state of $V_{CC} \leq Vc$ continues is determined as to whether to be equal to or greater than the specified period of time [Td] determined in advance or not, namely, whether $T_{CC} \geq Td$ or not (S38). If as the determination result at S38, the $T_{cc}$ is equal to or greater than the Td, namely, in the case of $T_{cc} \geq Td$ (the case of Yes), the processing proceeds to S34, at which it is determined that either one or more of the semiconductor switches 8b, 8c in the chopper 8 are short-circuited, so that the chopper 8 cannot be used due to being in a short-circuited state. Also in this case, although the electrical storage device 9 is unusable, a possibility that the MG 4 and the travel motor 6 are usable remains by turning off the relay 8f and electrically separating the electrical storage device 9.

On the contrary, in any one of the case of $V_{MG} > Vb$ (the case of No) at S36, the case of $V_{CC} > Vc$ (the case of No) at S37 and the case of $T_{cc} < Td$ (the case of No) at S38, it can be judged that no short-circuit occurs in the chopper 8, and thus, the respective semiconductor switches 7a, 7b of the travel motor inverter 7 are turned to an ON state at the gates (S41). After S41, the input voltage [$V_M$] detected by the inverter input voltage sensor 7f for the travel motor inverter 7 is determined as to whether to be equal to or less than the specified value [Va] determined in advance or not, namely, whether $V_M \leq Va$ or not (S42).

If as the determination result at S42, the $V_M$ is equal to or less than the Va, namely, in the case of $V_M \leq Va$ (the case of Yes), the continuation period of time [$T_M$] during which the state of $V_M \leq Va$ continues is determined as to whether to be equal to or greater than a specified period of time [Te] determined in advance or not, namely, whether $T_M \geq Te$ or not (S43). If as the determination result at S43, the $T_M$ is equal to or greater than the Te, namely, in the case of $T_M \geq Te$ (the case of Yes), it is determined that either one or more of the semiconductor switches 7a, 7b of the travel motor inverter 7 are short-circuited and that the travel motor inverter 7 is in a short-circuited state (S44).

On the contrary, if as the determination result at step S42, the $V_M$ is greater than the Va, namely, in the case of $V_M > Va$ (the case of No), or if as the determination result at step S43, the $T_M$ is less than the Te, namely, in the case of $T_M < Te$ (the case of No), it is determined that the travel motor inverter 7 is not in fault and that the semiconductor switches 7a, 7b are in a normal state without being short-circuited (S45). In this case, the MG inverter 5, the chopper 8 and the travel motor inverter 7 are all judged not to be in a short-circuited abnormality.

As described hereinabove in detail, according to the foregoing first embodiment, when an abnormality is detected with the input voltage to the MG inverter 5 for driving the MG 4 as an electric generator motor by the engine 3, it can reliably be judged whether or not the cause for the abnormality is a short-circuited abnormality. Further, when the short-circuited abnormality is determined as the cause, it can be determined which of the MG inverter 5, the travel motor inverter 7 and the chopper 8 is short-circuited.

Then, if the MG 4 is judged to be in a short-circuited state, the HCU 10 stops the running of the engine 3 through the ECU 3b to stop the rotational driving of the MG 4 by the engine 3, whereby the motor current of the MG 4 driven by the engine 3 can be made to zero. This makes it possible to prevent the heat generation at, for example, respective cables between the MG 4 and the MG inverter 5 and the occurrence of secondary damages or the like to the other components caused by the electric current that continues to flow through a short-circuited place. At the same time, the MG inverter 5, the travel motor inverter 7 and the chopper 8 can be prevented from being heated locally by the cause that the motor current flowing through the MG 4 flows through the MG inverter 5, the travel motor inverter 7 and the chopper 8, and thus, the damages of those can be prevented.

[Second Embodiment]

Figure 6:
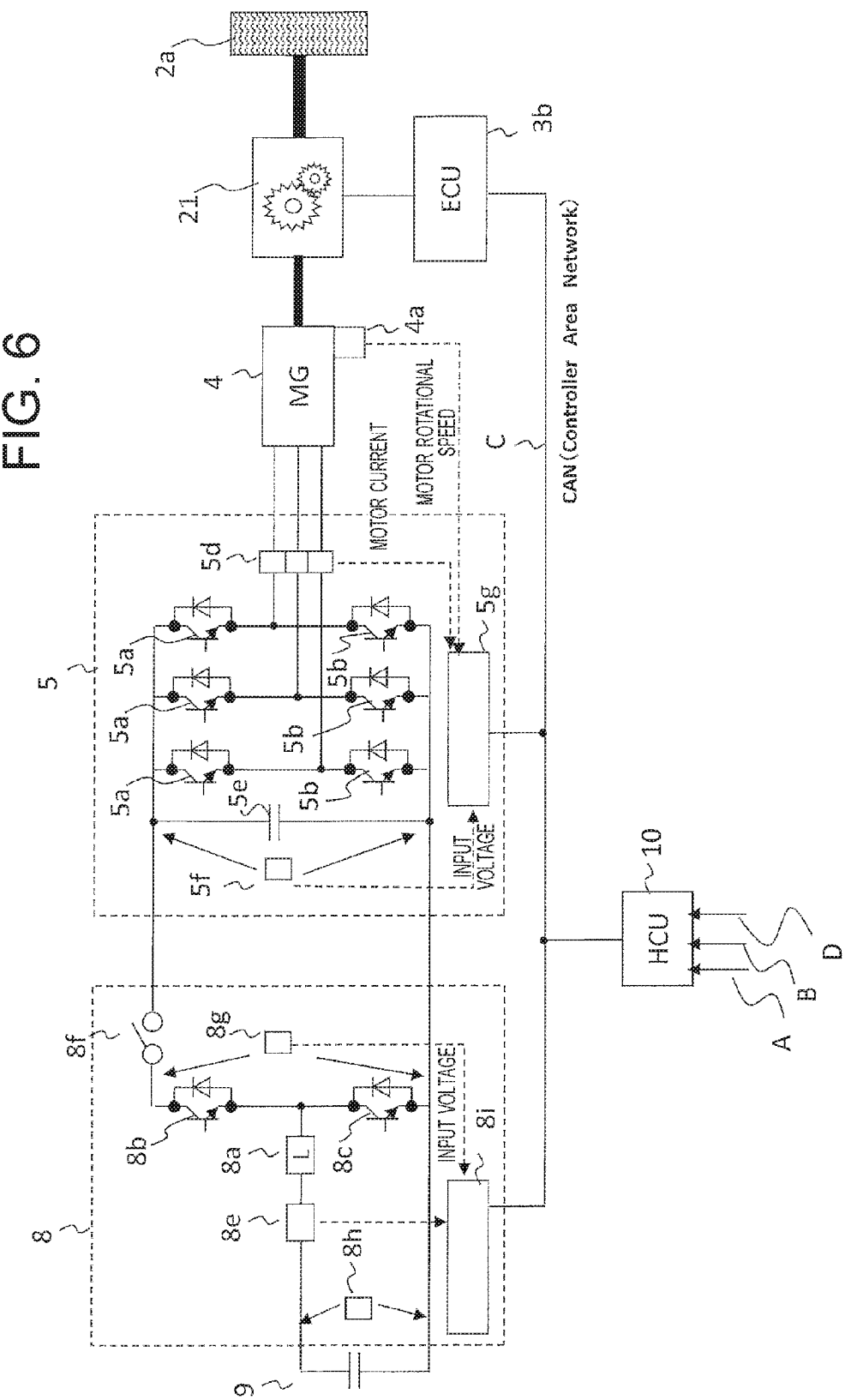
FIG. 6 is a schematic construction view showing a drive system of an electric wheel loader according to a second embodiment in the present invention.

FIG. 6 is a schematic construction view showing a drive system of an electric wheel loader according to a second embodiment in the present invention.

The difference of the second embodiment in the present invention from the foregoing first embodiment resides in that the travel motor 6 in the first embodiment is replaced by a motor/generator that is provided with a power generation function of converting the energy at the time of a deceleration travel into electric power to charge the same in the electrical storage device 9 as a drive source. Incidentally, parts that are the same as or correspond to those in the first embodiment are given the same symbols.

The electric wheel loader 1A as a working machine according to the second embodiment is provided with a load control device 21 for controlling the driving of the travel wheels 2a, and the travel wheels 2a are attached to the MG 4 through the load control device 21. The MG 4 is supplied with electric power from the electrical storage device 9 in functioning as a travel motor to rotationally drive the travel wheels 2. Then, the load control device 21 inputs the drive power from the MG 4 to transmit a rotational power to the travel wheels 2a. Further, the load control device 21 is provided with an emergency mechanical brake 21a, not shown.

On the other hand, at the time of a deceleration travel, the rotation of the travel wheels 2a is transmitted to the MG 4 through the load control device, and the MG 4 operates as an electric generator, whereby an electromotive force by the MG 4 is charged into the electrical storage device 9 through the MG inverter 5 and the chopper 8. The MG 4 is configured so that its function as a motor or an electric generator like this is controlled by the HCU 10 through the chopper control circuit 8i, the MG inverter control circuit 5g and a load control device control circuit 3b based on the aforementioned acceleration pedal signal and the brake signal.

Next, a determination method for a short-circuited fault in the aforementioned second embodiment will be described with reference to FIG. 7. FIG. 7 is a flowchart for detecting a short-circuited state in a synchronous electric generator.

When an abnormality of some kind such as a drop in the input voltage detected by the inverter input voltage sensor 5f and the like is detected by the HCU 10 in a state that the MG 4 is rotationally driven by the electric power stored in the electrical storage device 9 under the control by the HCU 10 of the load control device control circuit 3b, the MG inverter control circuit 5g and the chopper control circuit 8i, namely, in the state that the MG 4 is being operated as a motor, all of the semiconductor switches 5a, 5b, 8b, 8c in the MG inverter 5 (for the travel motor 6) and the chopper 8 are turned to an OFF state at the gates similarly to the first embodiment, and further, the relay 8f is turned to an OFF state (S11) to proceed to a processing for detecting a short-circuit at these semiconductor switches 5a, 5b, 8b, 8c and for determining a short-circuited place.

In a short-circuit determination for the MG 4, namely, up to step S7, a short-circuit determination processing according this second embodiment is the same as that in the first embodiment, and description of such determination will be omitted. When the MG 4 is determined to be in a short-circuited state at step S7, an input command to the emergency mechanical brake 21a is sent from the HCU 10 to the ECU 3b (S8). That is, an instruction signal for stopping the rotation of the MG 4 is sent in order to discontinue the traveling. Then, the rotational driving of the MG 4 is stopped, and the processing then proceeds to S13, at which the relay 8f is turned on after the stop of the MG 4 is completed.

After this, at step S14 to S17, the occurrence of short-circuit in the chopper 8 or the MG inverter 5 is determined through the same processing as that in the first embodiment.

On the other hand, where the MG inverter 5 is determined not to be short-circuited through the processing of S1-S6 and S21, the processing proceeds to S18, at which the control of the input voltage to the MG inverter 5 is started, and through the same processing of S31-S34, S35-S38 and S45 as that in the first embodiment, a determination is made that the chopper 8 is short-circuited (S34) or not short-circuited (S45).

Consequently, according to the second embodiment of the present invention, similarly to the foregoing first embodiment, when an abnormality is detected with the input voltage to the MG inverter 5 for traveling, it is possible to reliably judge whether the cause for the abnormality resides in a short-circuited abnormality or not. Further, when the short-circuited abnormality is determined as the cause, it is possible to determine which of the MG inverter 5 and the chopper 8 is short-circuited. Further, where the MG 4 is judged to be in a short-circuited state, the rotational driving of the MG 4 depending on the rotation of the travel wheels 2a is discontinued by stopping the traveling by the use of the emergency mechanical brake 21a, so that the motor current of the MG 4 that follows the rotational driving of the travel wheels 2a can be made to zero. Thus, it is possible to prevent the heat generation at, for example, respective cables between the MG 4 and the MG inverter 5 and the occurrence of secondary damages or the like to other components caused by the electric current that continues to flow through a short-circuited place. At the same time, the MG inverter 5 and the chopper 8 can be prevented from being heated locally by the cause that the motor current flowing through the MG 4 flows through the MG inverter 5 and the chopper 8, and thus, the damages of those can be prevented.

It is to be noted that the present invention is not limited to the foregoing embodiments and may cover various modified forms. For example, the foregoing embodiments have been exemplified for the purpose of describing the present invention in an easy-to-understand manner, and hence, the present invention should not necessarily be limited to those provided with all of the described constructions.

Further, in the foregoing respective embodiments, the mode has been described with the hybrid wheel loader or the electric wheel loader exemplified as a working machine. However, the present invention is not limited to this and can correspondingly be used also in any other working machine such as hydraulic excavator, forklift, dump truck, crane or the like so far as such working machine is capable of converting the energy obtained from the engine 3, the travel wheels 2a or the like into electric power and storing the same in the electrical storage device 9. Further, not only can the regeneration energy from the travel wheels 2a be used, but the regeneration energy can correspondingly be used that is taken from a hydraulic pump for driving the front working device 1b in the case of the wheel loader 1, 1A, from various hydraulic pumps for driving a front work mechanism and a swivel motor for turning a revolving upperstructure in the case of a hydraulic excavator, from a hydraulic pump for vertically moving a fork in the case of a forklift, from a hydraulic pump for dumping a loading platform in the case of a dump truck and from a swivel motor or the like for turning a revolving upperstructure in the case of a crane.

Further, in the foregoing respective embodiments, the electrical storage device 9 is sufficient as far as the same is chargeable and dischargeable and may be a buttery like lead battery besides capacitor, lithium-ion battery or the like. Furthermore, the respective semiconductor switches in the MG inverter 5, the travel motor inverter 7 and the chopper 8 may not be the IGBTs but be switching elements such as other power semiconductor elements or the like.

Furthermore, in the foregoing first embodiment, the MG 4 may be directly coupled to the output shaft 3c of the engine 3 or may be coupled through a belt or gears to the output shaft 3c like a crankshaft or the like of the engine 3.

REFERENCE SIGNS LIST

1 hybrid wheel loader (working machine)
1a body
1b front working device (drive unit)
1c lift arm
1d bucket
1e lift arm cylinder
1f bucket cylinder
1g bell crank
2 traveling unit (drive unit)
2a travel wheel
3 engine (drive source)
3a starter
3b ECU
3c output shaft
4 MG (permanent-magnet synchronous generator)
4a rotation sensor
5 MG inverter (inverter)
5a, 5b semiconductor switch (switching element)
5d motor current sensor (current detection unit)
5e main smoothing capacitor
5f inverter input voltage sensor (voltage detection unit)
5g inverter control circuit
6 travel motor (permanent-magnet synchronous generator)
6a travel propeller shaft
6b rotation sensor
7 travel motor inverter
7a, 7b semiconductor switch
7d motor current sensor
7e main smoothing capacitor
7f inverter input voltage sensor
7g inverter control circuit
8 chopper
8a reactor
8b, 8c semiconductor switch
8e chopper current sensor
8f relay
8g voltage sensor
8h electrical storage device voltage sensor
8i chopper control circuit
9 electrical storage device (drive source)
10 HCU (control unit)
21 load control device
A start signal
B acceleration signal
C CAN signal
D load brake output signal

The invention claimed is:

1. A working machine comprising:
a drive source;
a permanent-magnet synchronous generator driven by the drive source;
a travel motor driven by electric power generated by the synchronous generator to rotationally drive travel wheels;
an inverter having a current detection unit for detecting electric current flowing through the synchronous generator and switching elements;
a controller for detecting an electric abnormality in the synchronous generator;
a rotational speed detection device for detecting the rotational speed of the synchronous generator; and
a voltage detection unit for detecting an input voltage inputted to the inverter;
wherein the controller is adapted to:
input thereto a rotational speed signal from the rotational speed detection device and a voltage signal from the voltage detection unit and judge that an electric abnormality occurs in the synchronous generator, when the input voltage detected by the voltage detection unit is equal to or less than a predetermined voltage value and when the rotational speed of the synchronous generator detected by the rotational speed detection device is equal to or greater than a predetermined rotational speed that corresponds to the predetermined voltage value;

when detecting the electric abnormality in the synchronous generator, turn off gates of the switching elements of the inverter; and where in this state an electric current equal to or greater than a predetermined value is continuously detected by the current detection unit for a predetermined period of time or more, judge that the inverter is in a short-circuited state.

2. The working machine according to claim 1, wherein, the synchronous generator is driven by the energy regenerated from the travel motor, and the working machine comprises an electrical storage device charged with the electric power that is outputted from the synchronous generator through the inverter.

\* \* \* \* \*